W. H. MITCHELL.
ATTACHMENT FOR LAWN MOWERS.
APPLICATION FILED JAN. 27, 1919.
1,315,384.
Patented Sept. 9, 1919.
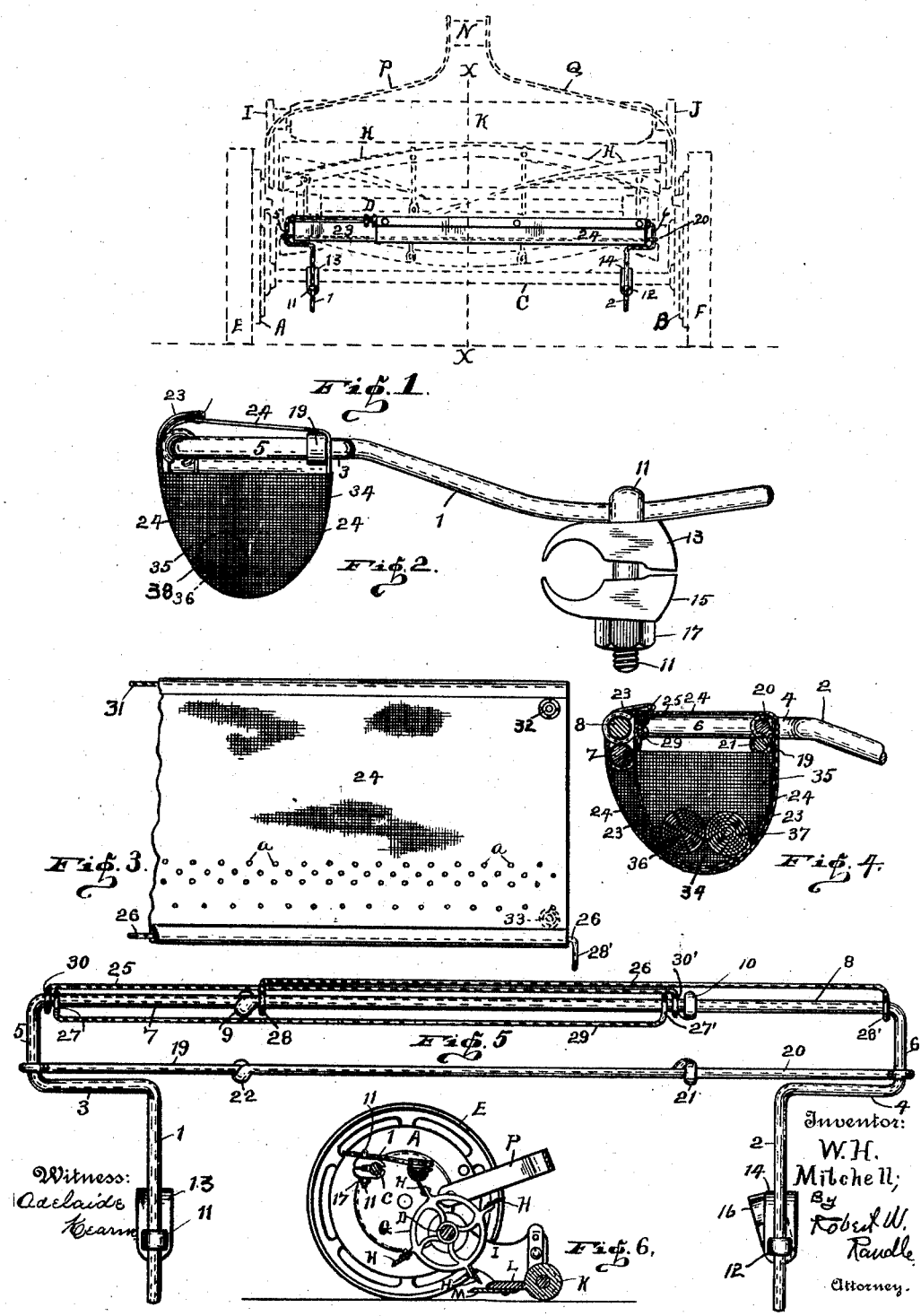

UNITED STATES PATENT OFFICE.

WILLIAM H. MITCHELL, OF RICHMOND, INDIANA.

ATTACHMENT FOR LAWN-MOWERS.

1,315,384.  Specification of Letters Patent.  Patented Sept. 9, 1919.

Application filed January 27, 1919. Serial No. 273,255.

*To all whom it may concern:*

Be it known that I, WILLIAM H. MITCHELL, a citizen of the United States, residing in the city of Richmond, in the county of Wayne, State of Indiana, have invented certain new and useful Improvements in Attachments for Lawn-Mowers, of which the following is a full, clear, and accurate presentation of the preferred embodiment thereof, such as will be readily comprehended by the ordinary mechanic.

Broadly stated the object is to produce an attachment adapted to be quickly secured in position on a lawn mower, for the purpose of sharpening the blades as the lawn-mower is propelled forward either idly or in its regular function of cutting grass.

More particularly stated the object is to provide an attachment for lawn-mowers having means for its suspension upon a lawn-mower and adapted to be extensible, within itself, for the purpose of adapting it to use upon lawn-mowers of various widths, and having means for holding abradant with oil and allowing it to be distributed upon the edges of the blades as they are in operation.

Other objects and special advantages of the invention will be suggested in the course of the following description.

One manner of carrying out the principles of my invention is shown in the accompanying drawings, in which—

Figure 1 is a top plan view of the invention, showing the same in operative position in connection with a lawn-mower.

Fig. 2 is an end elevation of the invention alone.

Fig. 3 is a plan view of a portion of the container alone.

Fig. 4 is a cross section of the main portion of the invention, taken as looking to the right from line X—X of Fig. 1.

Fig. 5 is a plan view of the frame portion of the invention.

And Fig. 6 is a cross section, as taken on line X—X of Fig. 1, and as looking to the right from said line.

Similar indices denote like parts throughout the several views.

In order that the construction, the operation, and the advantages of my invention may be fully understood and appreciated, I will now take up a detailed description thereof, in which I will set forth the construction as fully and as comprehensively as I may.

The lawn mower, shown in dotted lines, comprises the ends A and B, which are connected by the tie-rod C. Located parallel with and some distance from the tie-rod is the reel-shaft D which is geared to revolve by the rotation of the ground wheels E and F as they travel over the ground. Secured on the shaft D are a plurality of spiders G, to which are secured a plurality of spiral blades H, which blades operate in shearing contact with the blade M, the latter being carried by the cutter-bar L. The characters I and J denote the respective rear projections of the members A and B, the end portions of said projections may be supported by the roller K. Said bar L extends between and is supported by the projections I and J. Letter N denotes a portion of the handle by which the mower may be pushed forward, it being pivotally connected with the members A and B by the arms P and Q.

The above mentioned parts are merely shown to make clear the adaptability of my invention thereto, and the invention is not to be limited to said parts as shown, but may be variously changed to meet various conditions.

This invention comprises an extensible frame including the arms 1 and 2, having the respective right-angular outwardly extending intermediate portions 3 and 4, with the respective rearward extending short portions 5 and 6 at right-angles to the latter, and having the inwardly extending long rod-portions 7 and 8 which overlap each other in the center of the machine. The said parts 1, 3, 5 and 7 are formed of a single length of wire or rod. And the parts 2, 4, 6 and 8 are likewise formed of a single length of wire or rod, or other suitable material as desired.

The inner or free end portions of the members 7 and 8 are turned at right-angles and form the respective eye-members 9 and 10. The member 9 surrounds the part 7, and the member 10 surrounds the part 8, whereby the members 7 and 8 are slidably connected together.

Slidably mounted on the arms 1 and 2 are the respective eye-bolts 11 and 12, through the eyes of which said arms are disposed.

The bolt 11 is disposed through apertures in the jaws or clamp-members 13 and 15, the opposing faces of said jaws being concave to fit on the tie-rod C to which they may be secured by the nut 17. The bolt 12 is disposed through apertures in the jaws or clamp members 14 and 16, the opposing faces of said jaws being concave to fit on the tie-rod C, to which they may be secured by a nut corresponding with 17. It is evident that tightening the said nuts will rigidly secure the arms 1 and 2 in connection with the tie-rod C and manifestly the tightening of the clamp members or jaws by means of said nuts will also rigidly secure these parts to the rods 1 and 2.

Numerals 19 and 20 denote the two members of the spacing rod, the outer ends thereof being formed around the respective portions 5 and 6, with their inner end portions turned at right-angles forming the eye-members 21 and 22 through which slidably operate the respective members 20 and 19.

The container proper comprises two flexible sheet-like members 23 and 24, which may be formed of leather, fabric, rubber, or other sheet material, having a plurality of perforations $a$ formed therethrough and throughout the extent thereof.

Numerals 25 and 26 denote the main hanger rods for securing the permanent edges of the respective members 23 and 24. The rod 25 has right-angle eye-members 30 and 30' on the ends thereof, the former fitting around the rod 7, adjoining the member 5, and the latter fitting around the rods 7 and 8, near the eye-member 10.

In like manner the rod 26 has right angle eye-members 28 and 28' on its ends, the former fitting around the rods 7 and 8 near the eye member 9, and the latter fitting around the rod 8 adjoining the member 6 of the frame.

One edge of the flexible member 23 is secured around the rod 25, and the corresponding edge of the member 24 is secured around the rod 26. The other edge of the member 23 is secured around the rod 29, said rod 29 has right-angle hooks 27 and 27' on its ends, the former being adapted to hook around the rod 7 adjoining the eye-member 30, and the latter being adapted to hook around the rods 7 and 8 adjoining the eye member 30', thereby suspending the flexible member 23 in trough-like form, as in Fig. 2. The other edge of the member 24 may be secured in the same manner as that just described for member 23, but I prefer to secure it as hereinafter set forth, but in either event the last mentioned edge of the member 24 incloses the stiffening wire 31, while the corners are provided with snaps, similar to glove fasteners, and they include the male member 32 and the female member 33, as indicated in Fig. 3, whereby the edge having the wire 31 may be brought around over the rods 7 and 8 and the two edges may then be connected by said fasteners, thereby forming the member 24 of the same shape as the member 23, previously referred to, and thereby adapting the two members 23 and 24 to be telescoped together.

The outer end of the trough formed by the member 23 is closed by the end member 35, while the outer end of the trough formed by the member 24 is closed by the member 34.

Located in the trough formed by the members 23 and 24 are the two absorbent rollers 36 and 37. The outer end of the roller 36 is secured to the end 35, as by stitching 38 Fig. 2; and the outer end of the roller 37 is likewise secured to the end member 34. The lengths of said rollers are such that when the device is contracted to its limit then each of said rollers will reach from one to the other of the end members 34 and 35, but each roller is attached to but one of said end members, thereby permitting the rollers to slide endwise with relation to each other.

Operation: It will now be seen that the device may be attached to the tie-rod C of the lawn-mower by means of the clamps on the arms 1 and 2, and that the container may be adjusted forward, backward, up and down, whereby the lower edges of the members 23 and 24 will be in the path of the blades H as they revolve. It is also apparent that the device may be telescoped inward or outward in order to adapt it to lawn-mowers of various widths as required.

A supply of oil containing emery-dust in suspension may now be placed in the container, whereby the rollers 36 and 37 will become saturated therewith as well as the container members.

Now as the mower is pushed forward it is evident that the oil and emery will gravitate down and percolate through the apertures $a$, and as each blade H touches the container a small amount of the oil and emery will be scraped off and carried by the blades H to the blade M whereby, by reason of the shearing contact of said blades it is evident that the emery will cut and sharpen the edges of the blades, thereby placing them in proper cutting condition.

It has been found in practice that by operating the mower a short time with my device in operative condition in connection therewith that the blades will be properly sharpened, but in order to do this quickly the mower should be operated idle, that is without cutting grass, as the grass and moisture will tend to dilute the abradant and make the process much slower.

If desired, after sharpening the blades, the clamp nuts may be loosened and the device moved out of the path of the blades, after which the nuts may be tightened thereby holding the device out of operative position until again required, or the device may be entirely removed from the mower and then placed thereon only when it is desired to sharpen the blades, but I prefer to retain the device in operative position at all times, thereby keeping the blades in first class condition continuously.

It is, of course, to be understood that various changes may be made in the several details of construction without sacrificing any of the advantages of this invention, and without involving any of the rights which are covered by the claims hereunto appended.

Having now fully shown and described my invention, what I claim and desire to secure by Letters Patent of the United States, is—

1. An attachment for lawn mowers having end members with blades revolubly mounted between said members and a fixed blade with which the movable blades operate in shearing contact, a container for abradant adapted to permit the abradant to gravitate onto the movable blades, means for holding the abradant in the receptacle whereby it will gravitate slowly, and means for adjusting the device to various widths of lawn mowers.

2. An attachment for lawn mowers having end members connected by a tie-rod with a reel having blades mounted between the end members and a fixed blade with which the movable blades operate in shearing contact, a flexible trough-like receptacle having perforations therein, a frame for supporting said receptacle, means for telescopically adjusting the length of said receptacle and frame, and means for adjustably securing said frame to the tie-rod of the lawn mower, all substantially as shown and described.

3. An attachment for lawn mowers having end members connected by a tie-rod, blades forming a reel revolubly mounted between the end members, and a relatively fixed blade with which the reel blades are adapted to operate in shearing contact, said attachment comprising an extensible frame carried by the tie-rod, a pair of flexible container members carried by said frame and adapted to telescope one into the other, each of said container members having an end member connected to its outer end, and rollers located in the container each being secured at one end to one of said end members with their inner portions overlapping each other.

4. An attachment for lawn mowers having end members carried by ground wheels with a tie-rod connecting the end members with blades forming a reel revolubly mounted between the end members and a fixed blade with which the reel blades operate in shearing contact, said attachment comprising a telescopic receptacle formed of flexible material, a telescopic frame adjustably connected to the tie-rod, means for detachably connecting the receptacle with the respective portions of said frame, end members for the outer ends of the receptacle members, absorbent elements located in the container, and means for securing the absorbent elements in position.

5. An attachment for lawn mowers having end members connected by a tie-rod, said attachment comprising arms, means for rigidly connecting said arms to the tie-rod, a rod integral with each of said arms and extending parallel with the tie-rod, said rods being of lengths such as to overlap each other, means for slidably connecting each of said rods to the other one of said rods, an extensible rod-like member located parallel with said rods and carried thereby, the whole forming an extensible frame structure, all substantially as shown and described.

In testimony whereof I have hereunto subscribed my name to this specification in the presence of two subscribing witnesses.

WILLIAM H. MITCHELL.

Witnesses:
ROBT. W. RANDLE,
R. E. RANDLE.

Copies of this patent may be obtained for five cents each, by addressing the "Commissioner of Patents, Washington, D. C."